United States Patent [19]

Binder et al.

[11] 4,040,853

[45] Aug. 9, 1977

[54] PROCESS FOR THE PREPARATION OF RAW MIX FOR THE PRODUCTION OF CEMENT AND SULPHURIC ACID

[75] Inventors: Walter Binder, Linz; Josef Hutter, Linz-Dornach; Heinrich Stich, Ottensheim; Kurt Ruckensteiner, Leonding, all of Austria; Josef Tines, deceased, late of Linz, Austria; by Antonie Tines, legal representative, Altmunster; by Heide Schwarz, legal representative, Linz, both of Austria

[73] Assignee: Chemie Linz Aktiengesellschaft, Linz, Austria

[21] Appl. No.: 641,589

[22] Filed: Dec. 16, 1975

[30] Foreign Application Priority Data

Dec. 23, 1974 Germany .............................. 2461133

[51] Int. Cl.² .............................................. C04B 7/04
[52] U.S. Cl. ................................ 106/103; 423/541 R
[58] Field of Search ................ 106/103; 423/530, 541, 423/542

[56] References Cited

FOREIGN PATENT DOCUMENTS 1,671,215 9/1971 Germany ............................ 106/103
1,257,008 12/1971 United Kingdom ................. 106/103
929,202 6/1963 United Kingdom ................. 106/103

Primary Examiner—Winston A. Douglas
Assistant Examiner—J. V. Howard
Attorney, Agent, or Firm—Wenderoth, Lind & Ponack

[57] ABSTRACT

A process for the preparation of raw mix for the production of cement and sulphuric acid by the cement-sulphuric acid process, which mix comprises calcium sulphate, coke and other additives, by separate grinding of the materials used, which comprises grinding the coke alone to a degree of comminution corresponding to a grain size spectrum, by weight, of <60 µ 25 to 40%

60 to 90 µ 8 to 15%

>90 µ 45 to 70% and then mixing the ground coke with a finely ground mixture of calcium sulphate and the remaining additives, and the use of such raw mix in the production of cement and sulphuric acid.

11 Claims, No Drawings

PROCESS FOR THE PREPARATION OF RAW MIX FOR THE PRODUCTION OF CEMENT AND SULPHURIC ACID

The present invention relates to a process for the preparation of raw mix for the production of cement and sulphuric acid, and the use of such mix in the production of cement and sulphuric acid.

In the so-called cement-sulphuric acid process in which gypsum is used as a raw material it has hitherto been usual to grind the coke component of the raw mix very fine, in fact to approximately the same grain size as the calcium sulphate component and the other additives such as clay, sand and flue ash, since it was thought that such a high degree of comminution was necessary for the formation of calcium sulphide to proceed satisfactorily, which reaction partly occurs by direct interaction between carbon and calcium sulphate according to the known equation $CaSO_4 + 2C \rightleftarrows CaS + 2CO_2$.

Specific details concerning the degree of comminution of the raw meal are given in West German Offenlegungschrift No. 1,671,215, where it is stated that this is "less than 16%", for example 15 or 13% residue on a DIN 0.090 mm sieve.

Accordingly the degree of comminution of the coke component is generally for example:

$< 60 \mu$ 55 to 75%

60 to 90 $\mu$ 15 to 25%

90 to 200 $\mu$ 10 to 20%

In this connection it was particularly preferred to grind all the additives together, with the gypsum, since the particularly homogeneous mixture which is thus obtained was regarded as extremely advantageous.

It was also previously known to grind the additives separately and subsequently mix them, but this was primarily adopted in those cases where the sulphate component as already so fine that further grinding would have been pointless (West German Offenlegunschrift No. 1,671,215). It has surprisingly been found, in contrast to the former opinions, that the cement-sulphuric acid process may be particularly advantageously carried out if the coke is used with a larger grain size than was hitherto normal. Whereas the expected negative effects of a coarser grain size material are absent, it has been found that, in addition to saving energy in the grinding, there is even the advantage that less coke, in relation to $SO_3$, has to be used, since less coke is lost in the so-called pre-heating zone of the rotary kiln or in preheaters which may be connected to the plant.

Accordingly, the present invention provides a process for the preparation of raw mix for the production of cement and sulphuric acid by the cement-sulphuric acid process, which mix comprises calcium sulphate, coke and other additives, such as sand, by separate grinding of the materials used, which process comprises grinding the coke alone to a degree of comminution corresponding to a grain size spectrum, by weight, of $< 60 \mu$ 25 to 40%

60 to 90 $\mu$ 8 to 15%

$> 90 \mu$ 45 to 70% and then mixing the ground coke with a finely ground mixture of calcium sulphate and the remaining additives.

It is particularly preferred to grind the coke to a degree of comminution of:

$< 60 \mu$ 28 to 32%

60 to 90 $\mu$ 10 to 13%

$> 90 \mu$ 55 to 65%

The grinding of the coke may be carried out in a usual type of apparatus for this purpose, such as, for example, a ball mill.

After grinding, the ground coke having the grain distribution according to the invention is mixed with the separately ground calcium sulphate component and the additives, wherein a carbon: $SO_3$ ratio of 0.70 to 0.58 for example 0.65 to 0.58 or 0.65 to 0.70, preferably 0.62 to 0.58 may be maintained since the carbon losses by burning out are less than usual. Grinding of the calcium sulphate component is of course unnecessary in those cases where the calcium sulphate is already so fine that it is not necessary to grind it. This is especially the case if a waste gypsum from other processes, for example a gypsum obtained from a phosphoric acid process, is used for the cement-sulphuric acid process.

The raw mix prepared according to the invention may be processed into cement and sulphuric acid by any method normally employed for the cement-sulphuric acid process. It may be used equally in processes carried out with a so-called reducing kiln atmosphere, or in processes in which further air, the so-called tertiary air, is added to the region of the centre of the kiln. In this connection the kiln temperatures are normally 1400° to 1450° C.

The use of the raw mix according to the invention offers particular advantages in those cement-sulphuric acid processes which operate with a pre-heating of the raw mix in a so-called suspension type heat exchanger, wherein the raw mix used is preheated in counter-current with the gases leaving the kiln. The danger of burning out the carbon in such suspension type heat exchangers was in fact hitherto considered to be particularly great.

Using the raw mix produced according to the invention it is also possible to operate with oxygen contents of 0.6 to 20 vol. % in the gaseous atmosphere of the suspension type heat exchanger and to utilise the pre-heater in an optimum manner without the carbon losses exceeding the usual values. Indeed, by using the raw mix according to the invention and with the optimum temperature range, the usual carbon: $SO_3$ ratio of 0.65 to 0.70 not only may be maintained but also even may be reduced. It is possible to work with carbon: $SO_3$ ratios of 0.62 to 0.58, with the result that the theoretical carbon: $SO_3$ ratio of 0.50 is approached, which is of particular economic advantage.

The following Examples illustrate the invention and the manner in which it may be performed.

EXAMPLE 1

8.66 tonnes of natural anhydrite, 600 kg. of flue ash and 330 kg. of sand having a normal degree of comminution of $< 60 \mu$ 13%

60 to 90 μ 7%

> 90 μ 80% are mixed with 410 kg. of coke having a degree of comminution of

< 60 μ 30%

60 to 90 μ 12%

> 90 μ 58% and which was ground in a ball mill, and heated at 1400° to 1450° C in a rotary kiln with an oxygen content of 1 vol. %. 4.99 tonnes of cement clinker are obtained. 3.37 tonnes of sulphur dioxide leave the kiln and, after normal cleaning, are catalytically converted at a temperature from 430° to 580° C. into 4.01 tonnes of sulphur trioxide corresponding to 5.01 tonnes of sulphuric acid.

The carbon: $SO_3$ ratio was 0.58. The cement clinker obtained corresponded to the accepted standards.

EXAMPLE 2

7.99 tonnes of waste gypsum from a process for the production of phosphoric acid by the wet method were ground together with 1.13 tonnes of flue ash and 440 kg. of sand to the degree of comminution stated in Example 1. 440 kg. of separately ground coke having a degree of comminution of

< 60 μ 28%

60 to 90 μ 10%

> 90 μ 62% were added to the remaining components and preheated to a temperature from 650° to 750° C. by the $SO_2$-containing kiln gases in a suspension type heat exchanger connected to a rotary kiln of conventional construction.

5.0 tonnes of cement clinker were produced at a temperature from 1400° to 1450° C. in the sinter zone of the rotary kiln. 3.33 tonnes of $SO_2$ were obtained and were catalytically converted at a temperature from 430° to 580° C. to $SO_3$ corresponding to 4.96 tonnes of sulphuric acid. The carbon: $SO_3$ ratio was 0.58. The cement clinker obtained corresponded to the accepted standards.

What we claim is:

1. A process for the preparation of a raw mix suitable for use in the production of cement and sulphuric acid by the cement-sulphuric acid process, which comprises separately grinding coke to a degree of comminution such that 25 to 40% by weight of the ground coke has a grain size of less than 60μ, 8 to 15% by weight of the ground coke has a grain size of 60 to 90μ, and 45 to 70% by weight of the ground coke has a grain size of greater than 90μ, and mixing the ground coke with a ground mixture of calcium sulphate and remaining additives.

2. A process according to claim 1, in which one of the said remaining additives is sand.

3. A process according to claim 1, in which the coke is ground to a degree of comminution such that 28 to 32% by weight of the ground coke has a grain size of less than 60μ, 10 to 13% by weight of the ground coke has a grain size of 60 to 90μ, and 55 to 65% by weight of the ground coke has a grain size of greater than 90μ.

4. A process according to claim 1, in which the ratio of carbon: $SO_3$ in the raw mix is adjusted to 0.65 to 0.58.

5. In a process for the production of sulphuric acid and cement by the cement-sulphuric acid process, which comprises using a raw mix comprising calcium sulphate, coke and other additives, the improvement wherein the coke component of the raw mix has a grain size spectrum such that 25 to 40% by weight of the coke grains have a grain size of less than 60μ, 8 to 15% by weight of the coke grains have a grain size of 60 to 90μ, and 45 to 70% by weight of the coke grains have a grain size of greater than 90μ.

6. A process according to claim 5, in which the coke component of the raw mix has a grain size spectrum such that 28 to 32% by weight of the coke grains have a grain size of less than 60μ, 10 to 13% by weight of the coke grains have a grain size of 60 to 90μ, and 55 to 65% by weight of the coke grains have a grain size of greater than 90μ.

7. A process according to claim 5, in which the ratio of carbon: $SO_3$ in the raw mix is adjusted to 0.65 to 0.58.

8. A process for the production of sulphuric acid and cement by the cement-sulphuric acid process according to claim 5, which comprises heating a raw mix comprising calcium sulphate, coke and sand, in which the ratio of carbon: $SO_3$ is 0.65 to 0.58 and the coke component in the raw mix has a grain size spectrum according to claim 5 at 1400° to 1450° C in a rotary kiln to obtain cement clinker and sulfur dioxide.

9. A process according to claim 8, in which the raw mix is pre-heated by a suspension type heat exchanger connected with the rotary kiln before being fed into aid kiln, the gaseous atmosphere of said heat exchanger having an oxygen content of 0.6 to 2.0 Vol.%.

10. A composition which comprises ground calcium sulfate and coke having a grain size spectrum such that 25 to 40% by weight of the coke grains have a grain size of less than 60μ, 8 to 15% by weight of the coke grains have a grain size of 60 to 90μ, and 45 to 70% by weight of the coke grains have a grain size of greater than 90μ.

11. A composition according to claim 10, in which the coke has a grain size spectrum such that 28 and 32% by weight of the coke grains have a grain size of less than 60μ, 10 to 13% by weight of the coke grains have a grain size of 660 to 90μ, and 55 to 65% by weight of the coke grains have a grain size of greater than 90μ.

* * * * *